US006398850B1

(12) United States Patent
Field et al.

(10) Patent No.: US 6,398,850 B1
(45) Date of Patent: Jun. 4, 2002

(54) GAS EXTRACTION DEVICE FOR EXTRACTING GAS FROM A MICROFLUIDICS SYSTEM

(75) Inventors: Leslie A. Field, Portola Valley; David K. Donald, Mountain View; Phillip W. Barth, Portola Valley, all of CA (US); Jonathan Servaites, Anapolis, MD (US); Storrs T. Hoen, Brisbane, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/892,203

(22) Filed: Jun. 25, 2001

Related U.S. Application Data

(62) Division of application No. 09/221,026, filed on Dec. 23, 1998, now Pat. No. 6,299,673.

(51) Int. Cl.[7] .............................. B41J 2/19; B41J 2/175; B01D 19/00

(52) U.S. Cl. .............................. 95/241; 95/251; 95/252; 95/254; 96/185; 96/201; 96/218; 347/92

(58) Field of Search .......................... 96/185, 201, 218; 95/241, 251, 252, 254; 347/92

(56) References Cited

U.S. PATENT DOCUMENTS 4,301,459 A * 11/1981 Isayama et al.
4,368,478 A * 1/1983 Koto
4,502,055 A * 2/1985 Horike et al.
5,341,162 A * 8/1994 Hermanson et al.
5,621,444 A * 4/1997 Beeson
6,062,681 A * 5/2000 Field et al.
6,109,744 A * 8/2000 Nishimura
6,113,223 A * 9/2000 Tanaka et al.
6,299,673 B1 * 10/2001 Field et al.

* cited by examiner

*Primary Examiner*—Thomas M. Lithgow

(57) ABSTRACT

A thermally-activated gas extraction device that comprises a bubble capture chamber, an exhaust manifold, a tapered extraction chamber and an extraction heater associated with the tapered extraction chamber. The tapered extraction chamber extends from the bubble capture chamber towards the exhaust manifold and has a cross-sectional area that increases towards the exhaust manifold. A gas removal method in which the gas extraction device is provided, a bubble of gas is accumulated in the bubble capture chamber, a portion of the liquid in the tapered extraction chamber heated to nucleate a bubble of vapor, and the bubble of vapor is heated to explosively expand the bubble of vapor into contact with the walls of the tapered extraction chamber and into contact with the bubble of gas to form a composite bubble. Contact with the walls of the tapered extraction moves the composite bubble towards the exhaust manifold. Finally, heating of the composite bubble is discontinued to condense the vapor in the composite bubble.

9 Claims, 10 Drawing Sheets

GAS EXTRACTION DEVICE FOR EXTRACTING GAS FROM A MICROFLUIDICS SYSTEM

CROSS REFERENCE TO RELATED APPLICATION(S)

This is a divisional of application Ser. No. 09/221,026 filed on Dec. 23, 1998 now U.S. Pat. No. 6,299,673 which is hereby incorporated by reference herein.

FIELD OF THE INVENTION

The invention relates to a device for extracting gas from a microfluidics system, and, in particular, to removing dissolved air from the ink flowing into the print head of an inkjet printer.

BACKGROUND OF THE INVENTION

The print head of an inkjet printer forms part of a print cartridge mounted in a carriage. The carriage moves the print cartridge back and forth across the paper. The print head includes many orifices, typically arranged in line aligned parallel to the direction in which the paper is moved through the printer and perpendicular to the direction of motion of the print head. Each orifice constitutes the outlet of a firing chamber in which is located a firing element such as a heating element or piezoelectric element. The firing element operates in response to an electrical signal to cause minute droplets of ink to be ejected from the orifice.

Ink from a reservoir is supplied to the firing chambers through an ink manifold in the print head. The ink reservoir may be located in the ink cartridge behind the print head. Alternatively, the ink reservoir may be independent of the print cartridge and be mounted in a static location. In this case, the ink flows through a flexible tube from the ink reservoir to the print head.

During manufacture, ink with a carefully controlled concentration of dissolved air is sealed in the ink reservoir. When some types of ink reservoir are installed in a printer, either independently or as part of the ink cartridge, the seal is broken to admit ambient air to the ink reservoir. This is necessary to enable air to replace the ink drawn from the ink reservoir during printing. Exposing of the ink in the ink reservoir to the ambient air causes the amount of air dissolved in the ink to increase over time.

When additional air becomes dissolved in the ink stored in the ink reservoir, this air is released from solution by the action of the firing mechanism in the firing chamber of the print head. The excess air accumulates as bubbles in the firing chamber. The bubbles can migrate from the firing chamber to other locations in the print head where they can block the flow of ink. Moreover, the additional air can be released from solution by environmental changes, such as temperature changes or changes of atmospheric pressure. The additional air can then form bubbles that can block the flow of ink in or to the print head.

It is undesirable to allow air bubbles to remain in the print head. Air bubbles can degrade the print quality, can cause a partially-full print cartridge to appear empty, requiring premature replacement of the ink cartridge. Air bubbles can also cause ink to leak from the orifices when the printer is not printing, especially when environmental changes occur.

What is needed, therefore, is a gas extraction device for use in a microfluidics system. Such a device should at least be capable of extracting bubbles of gas from locations in the microfluidics system where bubbles of gas accumulate and of delivering the gas to the atmosphere against any pressure difference that may exist. Optionally, the device should also be capable of releasing dissolved gas from the liquid in the microfluidics system prior to extracting the gas. In particular, what is needed is a gas extraction device for an ink jet printer. The gas extraction device should at least be capable of extracting bubbles of additional air from locations in the ink storage and delivery system of the ink jet printer where bubbles of air released from the ink accumulate, and of delivering the additional air to the atmosphere against the negative pressure difference that generally exists between the ink storage and delivery system and the atmosphere. Optionally, the gas extraction device should also be capable of releasing the dissolved air from the ink as the ink flows through the ink delivery system in or to the print head, or from the ink stored in the ink storage reservoir. What is also needed is a gas extraction device capable of extracting gas from a microfluidics system, and that lacks moving parts, is easy and cheap to fabricate, and that has low energy consumption. Finally, what is needed is a gas extraction device for an ink jet printer that can easily be structurally integrated with other parts of the print head, and that can be fabricated using the same manufacturing processes as other parts of the print head.

SUMMARY OF THE INVENTION

The invention provides a thermally-activated gas extraction device that comprises a bubble capture chamber, an exhaust manifold, a tapered extraction chamber and an extraction heater associated with the tapered extraction chamber. The tapered extraction chamber extends from the bubble capture chamber towards the exhaust manifold and has a cross-sectional area that increases towards the exhaust manifold.

The invention also provides a thermally-activated gas extraction device that comprises a substrate, an exhaust manifold, a barrier layer supported by the substrate, and extraction heaters supported by the substrate. Elements are formed in the barrier layer. The elements include a bubble capture chamber, a tapered primary extraction chamber and a tapered secondary extraction chamber. The primary extraction chamber extends from the bubble capture chamber, includes a wide end remote from the bubble capture chamber and has a cross-sectional area that increases towards the exhaust manifold. The secondary extraction chamber extends from the wide end of the primary extraction chamber towards the exhaust manifold, and also has a cross-sectional area that increases towards the exhaust manifold. Ones of the extraction heaters are associated with each of the primary extraction chamber and the secondary extraction chamber.

The invention further provides a first method of removing gas from a liquid. In the method, a bubble capture chamber, an exhaust manifold, and a tapered extraction chamber are provided. The tapered extraction manifold extends from the bubble capture chamber towards the exhaust manifold, and includes walls that taper outwards with increasing distance from the bubble capture chamber. A bubble of gas is accumulated in the bubble capture chamber. A portion of the liquid in the tapered extraction chamber heated to nucleate a bubble of vapor. The bubble of vapor is heated to explosively expand the bubble of vapor into contact with the walls of the tapered extraction chamber and into contact with the bubble of gas to form a composite bubble. Contact with the walls of the tapered extraction moves the composite bubble towards the exhaust manifold. Finally, heating of the composite bubble is discontinued to condense the vapor in the composite bubble.

Finally, the invention provides a second method of removing gas from a liquid. In the method, an exhaust manifold and a tapered extraction chamber are provided. The bubble capture chamber includes a boundary having a spatial energy potential. The tapered extraction chamber extends from the bubble capture chamber towards the exhaust manifold, and includes walls and a mouth. The walls taper outwards with increasing distance from the bubble capture chamber. The mouth adjoins the bubble capture chamber and is dimensioned to have a spatial energy potential less than the spatial energy potential of the boundary of the bubble capture chamber. A bubble of gas is accumulated in the bubble capture chamber. The bubble of gas in the bubble capture chamber is heated to expand the bubble into the tapered extraction chamber. After expansion, the bubble includes a first surface having a first radius of curvature in the bubble capture chamber and a second surface having a second radius of curvature in contact with the walls of the tapered extraction chamber. Heating is continued at least until the bubble of gas expands to a size at which the second radius of curvature becomes greater than the first radius of curvature and a resulting pressure difference moves at least part of the bubble from the bubble capture chamber to the tapered extraction chamber.

DETAILED DESCRIPTION OF THE INVENTION

Figure 1A:
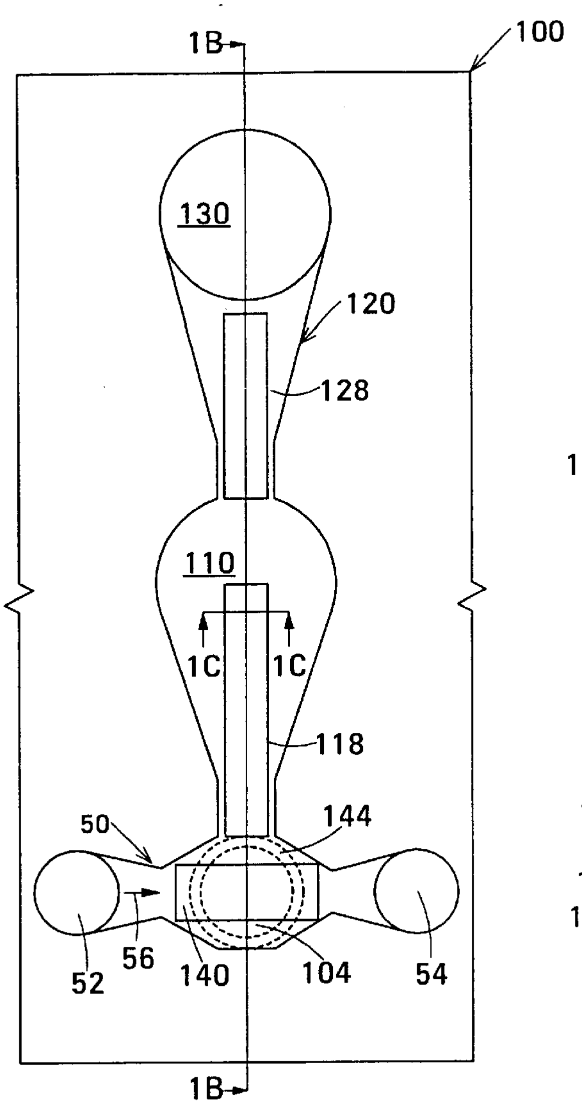
FIG. 1A is a plan view of a first embodiment of a gas extraction device according to the invention having a transparent cover that shows the inner structure.

The invention is based on the observation that, in a gas extraction device that includes a tapered extraction chamber coupled by a narrow neck to a bubble capture chamber in which an air bubble is captured, a vapor bubble nucleated in a liquid confined in the extraction chamber joins together with the air bubble as it expands, and draws at least part of the air bubble into the extraction chamber as it moves towards the wider end of the extraction chamber. Contact between the composite vapor/air bubble and the tapered walls of the extraction chamber then moves the composite bubble against the pressure gradient into an exhaust manifold at an ambient, e.g., atmospheric, pressure.

Before the invention is described in detail, some basic properties of gas bubbles in liquids in confined spaces will be discussed. When a gas bubble exists in a liquid, a bubble surface exists at the interface between the gas and the liquid. A pressure difference exists at the bubble surface. The pressure difference can be characterized by the radius r of the surface, the angle of contact θ, and the surface tension σ(T), i.e., $P=(2\sigma(T)\cos\theta/r)$. The surface tension σ(T) depends on the temperature T of the surface. The position of the bubble surface can be manipulated by varying one or more of the pressure difference, the surface tension and the radius of curvature.

If the bubble surface intersects a solid material, such as the wall of a channel, the angle of intersection between the bubble surface and the solid material depends on the wetting properties of the solid material with respect to both the gas in the bubble and the liquid surrounding the bubble. At one value of the angle of intersection, called the equilibrium contact angle, the bubble will stay at rest. If the angle of intersection changes, so that it becomes greater or less than the equilibrium contact angle, the bubble will tend to move.

As noted above, the pressure difference across the bubble surface is inversely proportional to the radius of curvature of the bubble surface. The temperature of the bubble surface of a bubble of water vapor in water is approximately 100° C. The surface tension of water at 100° C. is about 59 milliNewtons per meter (mN/m). If the bubble has a radius of 25 μm, then the pressure $P_r$ inside the bubble relative to the pressure of the surrounding water is $2\times59\times10^{-3}/25\times10^{-6}=4.72$ kiloPascals (kPa). This pressure difference is equal to the pressure exerted by a column of water approximately 46 cm tall. If the radius of the bubble is halved to 12.5 μm, then the pressure $P_r$ inside the bubble doubles to 9.44 kPa.

Also as noted above, the pressure difference $P_r$ across the bubble surface also depends on the surface tension of the bubble surface, which varies with temperature. For example, the surface tension of water decreases by approximately 22% over the temperature range of 0 to 100° C., i.e., by approximately 0.22%/°C. Thus, the change in the pressure difference $P_r$ caused by the effect of even a relatively large temperature change on the surface tension is small compared to the change in the pressure difference $P_r$ caused by changing the radius of curvature of the bubble surface.

A bubble located in a capillary channel is said to be wall-confined if the bubble is large enough for two, substantially opposite sides of the bubble to touch the walls of the channel simultaneously. For example, in an elongate liquid-filled channel having a circular cross section, most of the periphery of a bubble that is wall confined contacts the channel wall, yet the bubble is free to move along the length of the channel. If the bubble shrinks so that it touches the channel wall along less than 180° of its periphery, it is no longer wall-confined.

Like any fluid, bubbles tend to flow from a region of higher energy potential to a region of lower energy potential. The energy required to introduce a wall-confined bubble of a given volume into a given location in a channel is the product of the spatial energy potential of the location of the channel and the volume of the bubble. The spatial energy potential of a location is the energy required to introduce a bubble of unit volume into the location. Thus, the energy in Joules required to introduce a bubble having a volume of y ml into a location in a channel where the spatial energy potential is x Joules of energy per milliliter (ml) of bubble volume is given by the product xy. Moreover, if the channel includes a second location where the spatial energy potential z is less than that of the first location, i.e., $z<x$, the bubble will tend to move towards the second location from the first location because its overall energy is less in the second location than in the first.

The spatial energy potential of a location for a wall-confined bubble in a fluid is set both by geometry and by temperature. For a bubble of gas in a hydrophilic liquid, a narrow channel has a higher spatial energy potential than a wider channel, and a cool location has a higher spatial energy potential than a warmer location.

The invention will now be described with reference to examples in which the gas extraction device is used to remove additional air from the ink in an ink jet printer. The gas extraction device is shown located in an ink delivery channel through which ink is delivered to or through the print head. However, the gas extraction device when used in an ink jet printer is not limited to such locations, and may additionally or alternatively be located elsewhere. For example, the gas extraction device may be located in an ink channel adjacent the ink storage reservoir. In this location, ink circulates through the ink channel and the gas extraction device operates to maintain the air concentration in the ink in the desired range. Moreover, it will be apparent to one of ordinary skill in the art that the gas extraction device described herein can be used to extract gas from other types of microfluidics devices in addition to the ink storage and delivery system of an ink jet printer.

Figure 1B:
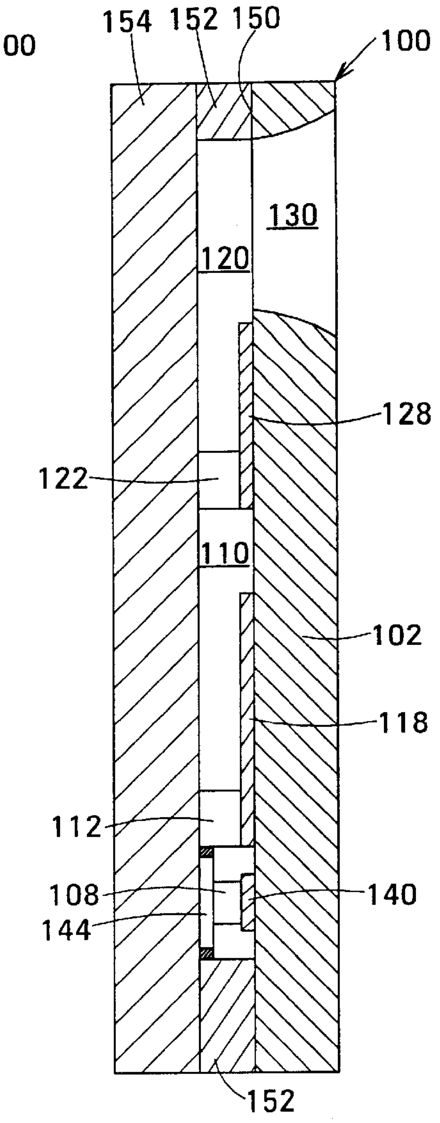
FIG. 1B is a cross-sectional view of the first embodiment of the gas extraction device according to the invention.
Figure 1C:
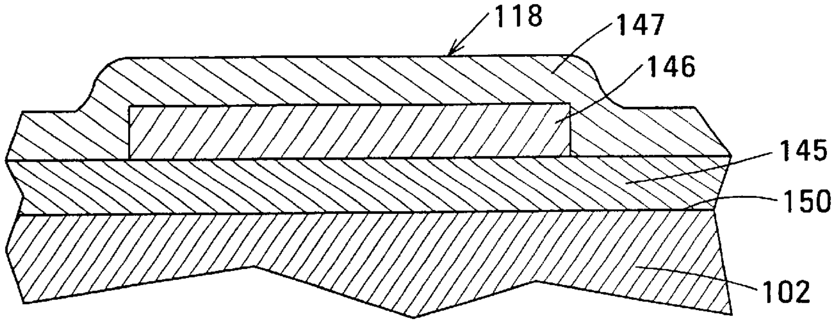
FIG. 1C is a cross sectional view showing details of the extraction heater of the gas extraction device according to the invention.
Figure 2B:
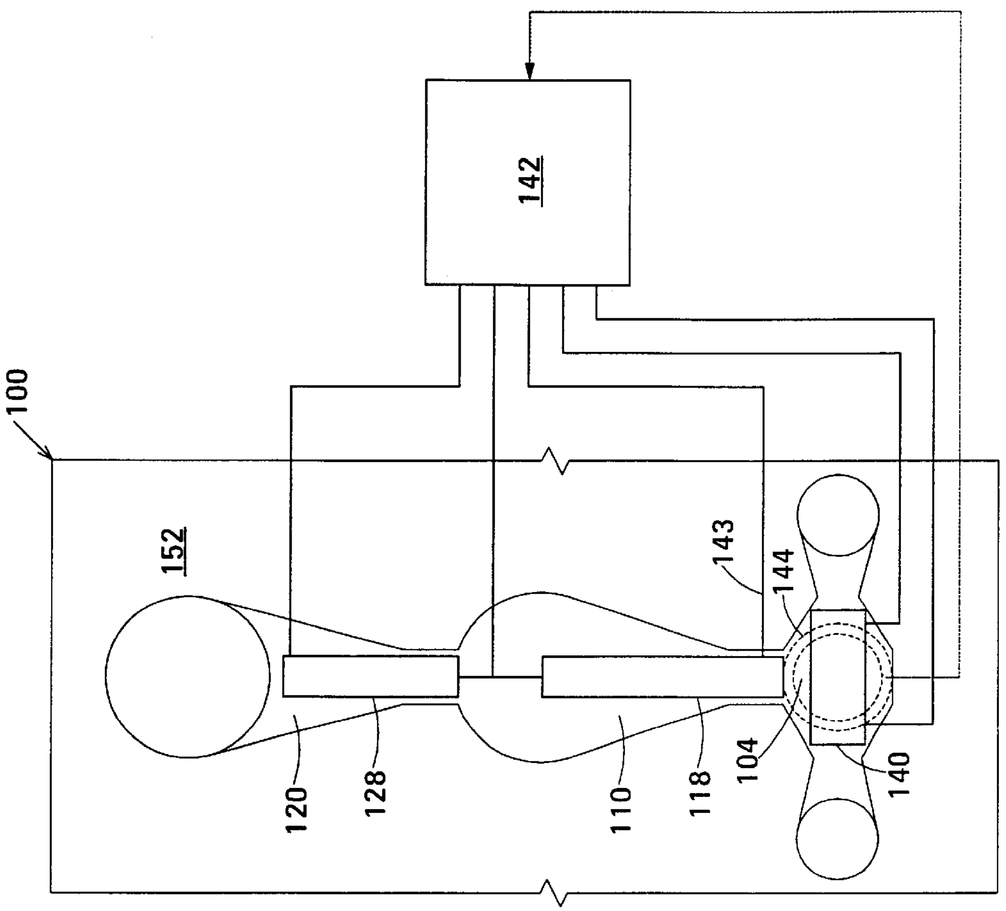
FIG. 2B schematically shows the electrical arrangement of the first embodiment of a gas extraction device according to the invention.
Figure 2A:
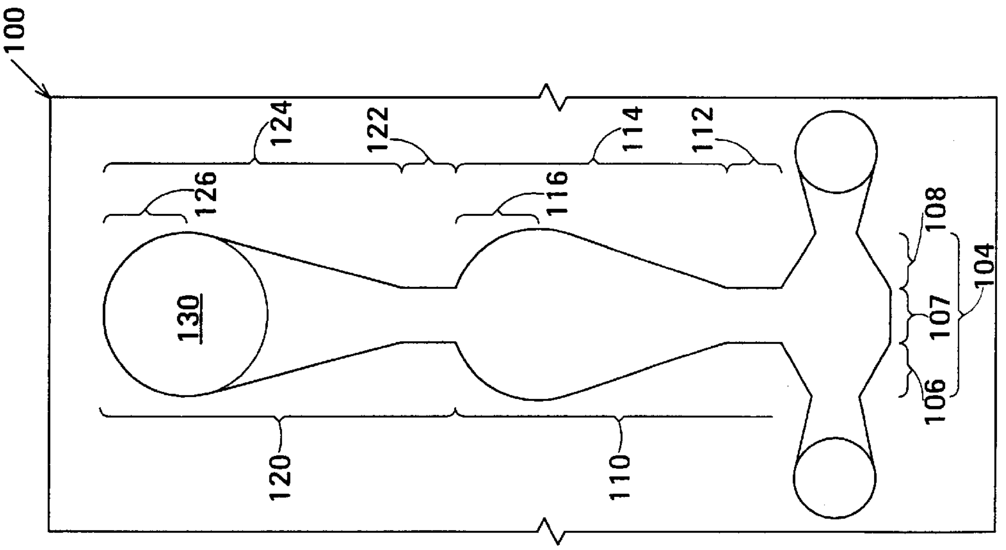
FIG. 2A is a plan view of the elements defined in the barrier layer in the first embodiment of a gas extraction device according to the invention.

FIGS. 1A and 1B show a first embodiment 100 of a gas extraction device according to the invention. Additional details are shown in FIGS. 1C, 2A and 2B. The embodiment shown is an active gas extraction device that includes a heater or other element that releases dissolved air from the ink passing through the ink delivery channel into or through the print head of the ink-jet printer. However, the invention also provides a passive gas extraction device that lacks such a heater or gas-releasing element. A passive gas extraction device can be located at a point in the ink delivery system where bubbles of air released from the ink accumulate. Such air could be released from the ink by the ink firing element, for example, or by environmental changes, as described above. Whether active or passive, the gas extraction device according to the invention extracts the bubbles of air from the ink delivery system and transfers them to an exhaust manifold. The gas extraction device therefore prevents the bubbles of air from causing problems described above.

The gas extraction device 100 is connected to a liquid flow channel, through which the liquid carrying the dissolved gas flows. In the example shown in FIGS. 1A and 1B, in which the gas extraction device operates in the ink system of an ink-jet printer, the ink delivery channel 50 corresponds to the fluid flow channel. The gas extraction device includes the bubble capture chamber 104 located in the ink delivery channel, the tapered primary extraction chamber 110, the extraction heater 118 associated with the primary extraction chamber, and the exhaust manifold into which the gas extraction device deposits the gas extracted from the liquid. In the embodiment shown in FIGS. 1A and 1B, the extraction heater 118 is associated with the primary extraction chamber by locating this heater in the primary extraction chamber.

Ink flows through the ink delivery channel 50 between the ink inlet 52 and the ink outlet 54 in the downstream direction indicated by the arrow 56. In the example shown, the ink inlet and the ink outlet are shown extending through the substrate 102 on which the gas extraction device is constructed. However, this is not critical to the invention. Only one of the ink inlet and the ink outlet may extend through the substrate. Alternatively, neither the ink outlet nor the ink inlet need extend through the substrate, and the ink may flow parallel to the surface of the substrate. Alternatively, either or both of the ink inlet and ink outlet may extend through the cover 154.

Referring additionally to FIG. 2A, the ink delivery channel 50 is shaped to define the bubble capture chamber 104. In the example shown, the bubble capture chamber includes the wide center portion 107 flanked by the narrower upstream and downstream portions 106 and 108. The downstream portion 108 is narrower than the upstream portion. The lower spatial energy potential of the center portion 107 compared with that of the narrower upstream and downstream portions 106 and 108 confines the bubbles of air released from the ink to the bubble capture chamber. The bubble capture chamber prevents the air released from the ink from travelling downstream into the print head, and from migrating upstream when the power is switched off.

The primary extraction chamber 110 is coupled to the ink delivery channel 50 at the bubble capture chamber 104. The primary extraction chamber is composed of the narrow, parallel-sided neck 112 in series with the tapered chamber 114. The neck is wider than both the upstream portion 106 and the downstream portion 108 of the bubble capture chamber. The tapered chamber 114 has a cross-sectional area that increases towards the exhaust manifold 130, i.e., with increasing distance from the neck 112. In the example shown, the cross-sectional area is increased by increasing the width of the tapered chamber. However, the cross-sectional area could additionally or alternatively be increased by increasing the height of the tapered chamber. The substantially semi-circular portion 116 of the tapered chamber 114 extends from the widest part of the tapered chamber, remote from the neck 112. The neck 112 connects the narrow end of the tapered chamber 114 to the bubble capture chamber.

The example shown also includes the secondary extraction chamber 120 located between the primary extraction chamber 110 and the exhaust manifold 130. The secondary extraction chamber has a structure similar to that of the primary extraction chamber, and is composed of the parallel-sided neck 122 in series with the tapered chamber 124. The tapered chamber 124 has a cross-sectional area that increases towards the exhaust manifold 130, i.e., with increasing distance from the neck 122. In the example shown, the cross-sectional area is increased by increasing the width of the tapered chamber. However, the cross-sectional area could additionally or alternatively be increased by increasing the height of the tapered chamber. The substantially semi-circular portion 126 of the tapered chamber extends from the widest part of the tapered chamber, remote from the neck 122. Alternatively, the tapered chamber 124 may also include a short parallel-sided section (not shown) interposed between the widest part of the tapered chamber and the substantially semi-circular portion 126. The neck 122 connects the narrow end of the tapered chamber 124 to the semicircular portion 116 of the tapered chamber 114.

The exhaust manifold 130 extends from the end of the tapered chamber 124 remote from the neck 122 through the thickness of the substrate 102 into direct or indirect communication with the atmosphere or other ambient. The exhaust manifold provides a path for the air removed from the ink delivery channel to vent to the atmosphere. The exhaust manifold may alternatively extend through the thickness of the cover 154.

The ink flowing through the ink delivery channel 50 is normally at a pressure equivalent to several centimeters of water below atmospheric pressure. To remove the air extracted from the ink from the bubble capture chamber 104 and to vent the extracted air into the atmosphere via the exhaust manifold 130, the gas extraction device 100 must pump the extracted air against the pressure difference between the ink pressure in the ink delivery channel and the pressure in the exhaust manifold. The pressure in the exhaust manifold is typically atmospheric pressure. In the embodiment shown in FIGS. 1A and 1B, the serial arrangement of the primary extraction chamber 110 and the secondary extraction chamber 120 between the bubble capture chamber 104 and the exhaust manifold 130 increases the maximum allowable pressure difference between the ink pressure in the ink delivery channel and atmospheric pressure in the exhaust manifold.

The serial arrangement of the primary extraction chamber 110 and the secondary extraction chamber 120 between the bubble capture chamber 104 and the exhaust manifold 130 also prevents ink from leaking from the ink delivery channel 50 to the exhaust manifold. The flow of ink from the ink delivery channel to the exhaust manifold is blocked by operating the gas extraction device so that an air bubble capable of blocking the entrance to the neck 112 is located in the bubble capture chamber 104 when no bubble capable of blocking the entrance to the neck 122 is located in the primary extraction chamber 110, and so that an air bubble capable of blocking the entrance to the neck 122 is located in the primary extraction chamber when no bubble capable of blocking the entrance of the neck 112 is located in the bubble capture chamber.

In applications in which the maximum allowable pressure difference is small, or in which the leakage of ink from the ink delivery channel is unimportant, only one extraction chamber may be needed. The primary extraction chamber 110 may be omitted, and the neck 122 of the secondary extraction chamber 120 may be connected directly to the bubble capture chamber 104. In applications in which the maximum pressure difference is larger than that which can be provided by a serial arrangement of two extraction chambers, at least one additional extraction chamber may be interposed between the primary and secondary extraction chambers. If multiple additional extraction chambers are interposed, the primary extraction chamber, the additional extraction chambers and the secondary extraction chamber are arranged in series between the bubble capture chamber and the exhaust manifold.

In the example shown, the secondary extraction chamber 120 has dimensions similar to that of the primary extraction chamber 110. However, the primary and secondary extraction chambers may have different dimensions from one another. In the example shown, in which the ink in the ink delivery channel is at a pressure lower than the pressure in the exhaust manifold, the secondary extraction chamber may be dimensioned to have a greater cross-sectional area than that of the primary extraction chamber. Also, in the example shown, the primary extraction chamber and the secondary extraction chamber are both shown extending substantially perpendicular to the direction of ink flow through the ink delivery channel 50. However, this is not critical to the invention. The long axis of the secondary extraction chamber may be orthogonal to, or at some other non-zero angle to the long axis of the primary extraction chamber. Such an arrangement may provide a significant reduction in the area of the gas extraction device 100.

Energy must be supplied to the air extracted from the ink to move the air from the bubble capture chamber 104 to the exhaust manifold 130 against the pressure difference between the ink pressure in the ink delivery channel 50 and atmospheric pressure in the exhaust manifold. In the example shown in FIGS. 1A and 1B, the energy is supplied in the form of heat generated by the extraction heater 118 located on the part of the substrate 102 that provides the floor of the primary extraction chamber 110 and the extraction heater 128 located on the part of the substrate 102 that provides the floor of the secondary extraction chamber 120. Each extraction heater is elongate and extends lengthways along the center line of the respective extraction chamber. Referring now to FIGS. 2A and 2B, the extraction heater 118 extends from the neck 112 to a point substantially coincident with the widest part of the tapered chamber 114. The extraction heater 128 extends from the neck 122 to a point that is preferably but not necessarily adjacent the exhaust manifold 130.

The embodiment shown additionally includes the gas release heater 140 located on the part of the substrate 102 that provides the floor of the bubble capture chamber 104. The gas release heater is structurally similar to the extraction heaters 118 and 128. The gas release heater warms the ink flowing through the ink delivery channel 50 to cause the ink to release dissolved air. The released air collects in a bubble that is confined to the bubble capture chamber. A passive embodiment would lack a gas release heater in its bubble capture chamber. The bubble capture chamber of a passive embodiment would capture air released from the ink by other means, such as by the action of the firing element of the printer, or by environmental changes.

In the preferred embodiment, the heaters 118, 128 and 140 are resistors connected to the controller 142 by conductive tracks located on the surface 150 of the substrate 102, as shown schematically in FIG. 2B. An exemplary track connecting the controller to the extraction heater 118 is shown at 143. The controller is also shown schematically in the Figure. Although the controller may be physically separate from the substrate 102, and connected thereto by conductors such as wires, the controller is preferably built in and on the surface 150 of the substrate using conventional semiconductor circuit fabrication techniques.

The controller 142 selectively passes respective electric currents through the resistors constituting the heaters 118, 128 and 140. The electric currents cause the heaters to generate heat. In the preferred embodiment, the controller supplied current to the extraction heaters 118 and 128 in a series of ten 5 ms-wide pulses, with 5 ms between consecutive pulses. However, the number of pulses, the pulse duration, the duty cycle, or any combination of these factors may be changed. Pulsing the current supplied to the extraction heaters reduces the transfer of heat from the heaters to the substrate, and maintains a clear temperature differential between the heaters and the substrate adjacent the heaters.

The controller 142 may be an open-loop controller that feeds current to the heaters 118, 128 and 140 at pre-determined times for pre-determined durations. Alternatively, one or more of the bubble capture chamber 104, the first extraction chamber 110 and the second extraction chamber 120 may be equipped with sensors, the controller may include respective bubble detector circuits that operate in response to the sensors, and the controller may control the heaters 118, 128 and 140 in response to the bubble detector circuits. A bubble detector circuit generates an electrical signal that depends on the presence of air, i.e., a bubble, or a liquid, i.e., ink, adjacent its respective sensor. The sensors may be located on the surface 150 of the substrate 102, or on the portions of the surface of the cover 154 that provides the ceilings of one or more of the bubble capture chamber 104, the primary extraction chamber 110, and the secondary extraction chamber 120.

An exemplary sensor located in the bubble capture chamber 104 is shown at 144 in FIGS. 1A, 1B and 2B. The sensor is part of a gas/liquid detector that generates a control signal that changes state when the air bubble in the bubble capture chamber has grown to such a size that a majority of the area of the sensor is in contact with the air contained in the bubble, instead of with the ink. When the controller 142 operates in response to the control signal generated by the gas/liquid detector that includes the sensor 144, the controller feeds current to the extraction heater 118 only when the control signal generated by the gas/liquid detector changes state, indicating that an air bubble of sufficient size has accumulated in the bubble capture chamber. The gas/liquid detectors disclosed in a patent application entitled High Output Capacitative Gas/Liquid Detector, simultaneously filed with this disclosure and assigned to the assignee of this disclosure are especially advantageous in detecting the size of the bubble. Such gas/liquid detectors operate in response to a high capacitance effect only detectable at applied voltages less than about 100 millivolts The entire disclosure of the just-mentioned patent application is incorporated into this disclosure by reference. The sensor of the gas/liquid detector of the type just described can additionally or alternatively be incorporated into the primary extraction chamber 110. The sensor is preferably located at the end of the primary extraction chamber remote from the neck 112.

Circuits that can be used in the controller 142 to control the flow of current through the heaters 118, 128 and 140 at predetermined times and with predetermined durations, or in response to a signal generated by a gas/liquid detector, are known in the art and will not be described here.

Although the heaters 118, 128 and 140 have been described as resistors through which current is selectively passed to cause them to generate heat, the precise mechanism by which the heaters generate heat is not critical to the invention. The heaters may include energy dissipaters that convert other forms of energy, such as optical or RF electromagnetic radiation, or an alternating magnetic field, into heat using structures and techniques known in the art.

The cross sectional views of FIGS. 1B and 1C show additional details of the construction of a preferred embodiment of the gas extraction device 100. The preferred embodiment is fabricated by micromachining techniques that use semiconductor fabrication processing to make miniature mechanical structures. Such techniques are known in the art, so the process of making the gas extraction device will not be described in detail here. The gas extraction device 100 is one of a large number of identical gas extraction devices simultaneously fabricated on a wafer of single-crystal silicon. Part of the wafer constitutes the substrate 102. After the fabrication process is complete, the wafer and the additional layers applied to the wafer are broken or cut to yield the individual gas extraction devices.

The silicon wafer is anisotropically etched through its thickness to form the ink inlet, the ink outlet and the exhaust manifold of each gas extraction device, including the ink inlet 52, the ink outlet 54 and the exhaust manifold 130 of the gas extraction device 100. The heaters 118, 128 and 140 of each gas extraction device, including the heaters 118, 128 and 140 of the gas extraction device 100, are then fabricated on the surface of the wafer at precisely defined locations relative to the locations of the ink outlet, the ink inlet and the exhaust manifold. Fabrication of the preferred embodiment of the heaters will be described below.

The surface of the wafer is then coated with a layer of barrier material to form the barrier layer in which the ink delivery channel, including the bubble capture chamber, and the primary and secondary extraction chambers of each gas extraction device are defined. The part of the barrier layer in which the ink delivery channel 50, including the bubble capture chamber 104, and the primary and secondary extraction chambers 110 and 120 of the gas extraction device 100 are defined is shown at 152. The barrier layer may be a layer of photosensitive barrier material, such as polyimide. The photosensitivity of the barrier material enables the shapes of the ink delivery channel and the primary and secondary extraction chambers to be defined in the barrier layer using a conventional masking and solvent removal process. In a preferred embodiment, the barrier layer was a layer of a so-called high aspect ratio photoresist, such as SU-8 epoxy-based photoresist sold by MicroChem Corp., Newton, Mass. 02164-1418.

The thickness of the barrier layer is preferably greater than the widest dimensions of the ink delivery channel and the primary and secondary extraction chambers. This makes any wall-confined bubble prolate in shape, and ensures that the spatial energy potential at any point in the ink delivery channel and the primary and secondary extraction chambers is principally defined by the width of the channel or the chamber, respectively. However, in practice, it is difficult to fabricate the desired elements in a barrier layer of the necessary thickness. Consequently a thinner barrier layer is normally used and the bubbles are consequently oblate. However, the spatial energy potential at any point in the ink delivery channel and the primary and secondary extraction chambers still depends on the width of the respective channel or chamber in such devices.

A mask (not shown), patterned to define the shapes of the ink delivery channel and the primary and secondary extraction chambers of each gas extraction device to be formed on the wafer, including the ink delivery channel 50 and the primary and secondary extraction chambers 110 and 120 of the gas extraction device 100, is aligned relative to the heaters already formed on the surface of the wafer. The barrier layer is then exposed to light through the mask. The wafer is then processed with solvents to remove the portions of the barrier layer corresponding to the shapes defined by the mask. Removing such portions of the barrier layer forms the ink delivery channel and the primary and secondary extraction chambers of each gas extraction device, including the ink delivery channel 50 and the primary and secondary extraction chambers 110 and 120 of the gas extraction device 100. Removing portions of the barrier layer additionally exposes the heaters located on the surface of the wafer. The surface of the wafer provides the floor, and the barrier layer provides the side walls of the ink delivery channel, the primary extraction chamber and the secondary extraction chamber of each gas extraction device formed in the wafer. FIG. 2A shows the ink delivery channel 50, the primary extraction chamber 110 and the secondary extraction chamber 120 of the gas extraction device 100 defined by the portion 152 of the barrier layer not removed by the solvent.

The fabrication method just described can easily be adapted to define the shapes of the ink delivery channel and the extraction chambers in a layer of non-photosensitive barrier material. In this case, an additional layer of photoresist is applied to the layer of barrier material to define the shapes that will be formed in the barrier layer. Alternatively, the barrier layer may be composed entirely of a layer of photoresist.

A cover is then attached to the barrier layer. The cover provides the ceiling of the ink delivery channel and the primary and secondary extraction chambers of each gas extraction device formed on the wafer. The portion of the cover that provides the ceiling of the ink delivery channel 50 and the primary and secondary extraction chambers 110 and 120 of the gas extraction device 100 is shown at 154. The cover may be a second silicon wafer or a thin sheet of glass or a suitable plastic such as polyimide. The wafer, together with the barrier layer and the cover are then broken or cut into individual gas extraction devices, including the gas extraction device 100.

FIG. 1C is an enlarged cross-sectional view of part of the gas extraction device 100 showing details of the structure of the extraction heater 118 that includes the resistor 146. The structure of the extraction heater 128 is similar. The surface 150 of the substrate 102 is covered by the layer 145 of silicon dioxide. This layer may be formed by subjecting the surface of the substrate 102 to a wet oxidation process, for example. The silicon dioxide layer 145 provides thermal and electrical insulation between the heater and the substrate.

A layer of doped polysilicon is then deposited on the silicon dioxide layer 145 by low-pressure chemical vapor deposition (LPCVD), for example, and is then annealed to activate the dopants. Parts of the polysilicon layer are selectively removed using a plasma dry etch, for example, to define the resistors constituting the heaters 118, 128 and 140. The polysilicon resistor constituting the extraction heater 118 is shown at 146. Additional selective doping may then be applied to the heaters to define their conductivity profile and, hence, their heat generation profile. A layer of metal such as aluminum (not shown) is then deposited on the surface of the substrate and is selectively removed to define the tracks, such as the track 143 shown in FIG. 2B, electrically connecting the heaters 118, 128 and 140 to the controller 142 or to bonding pads (not shown) to provide external connections. As an alternative to polysilicon, the heaters may be formed of a metal such as nickel or tungsten, or of some other suitable resistive material.

The layer 147 of silicon nitride or other suitable dielectric material covers the heaters 118, 128 and 140 and the tracks (not shown) interconnecting the heaters to the controller 142. The silicon nitride may be deposited by sputtering or by plasma-enhanced chemical vapor deposition (PECVD), for example. The silicon nitride layer 147 provides electrical insulation and physical isolation between the heaters and the ink.

Although the gas extraction device according to the invention is is preferably made using micromachining, as described above, other methods may be used to fabricate the gas extraction device. For example, hard tooling may be fabricated and used to mold the gas extraction device or components thereof in a suitable plastic such as polycarbonate.

The operation of the gas extraction device 100 according to the invention will now be described with reference to FIGS. 3A through 3L.

Figure 3C:
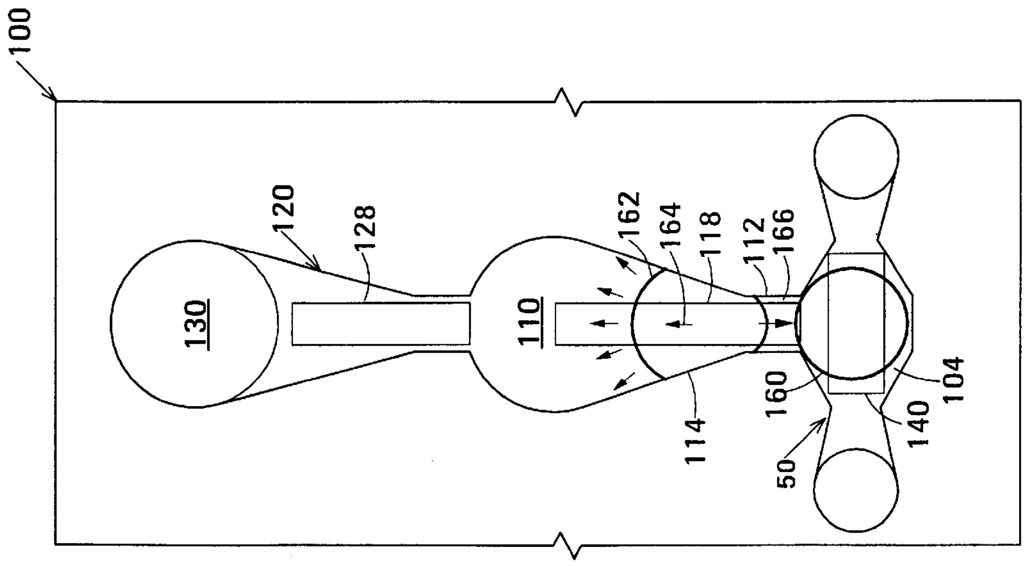
FIGS. 3A–3I and 3K are plan views of the first embodiment of a gas extraction device according to the invention illustrating the first method of removing gas according to the invention.
Figure 3B:
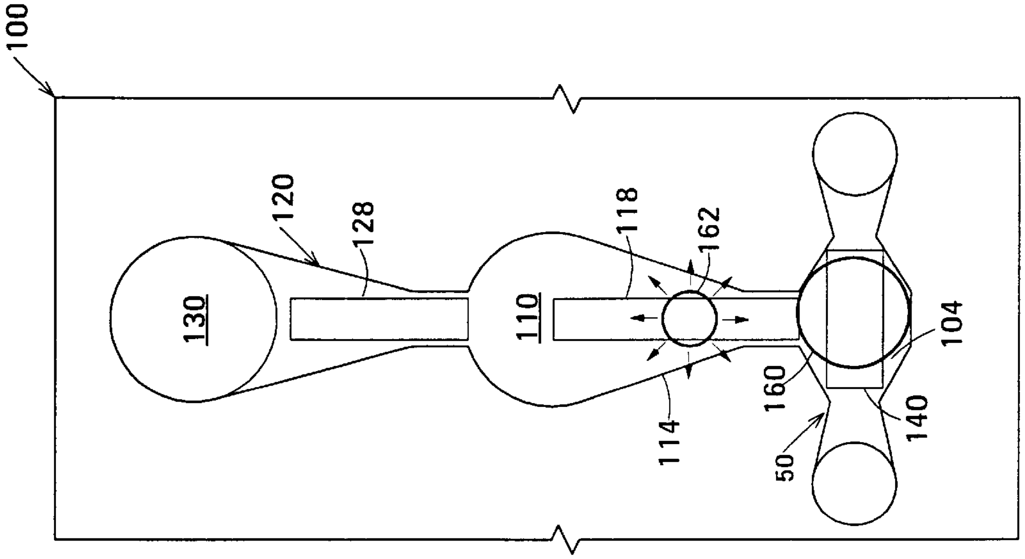
Figure 3A:
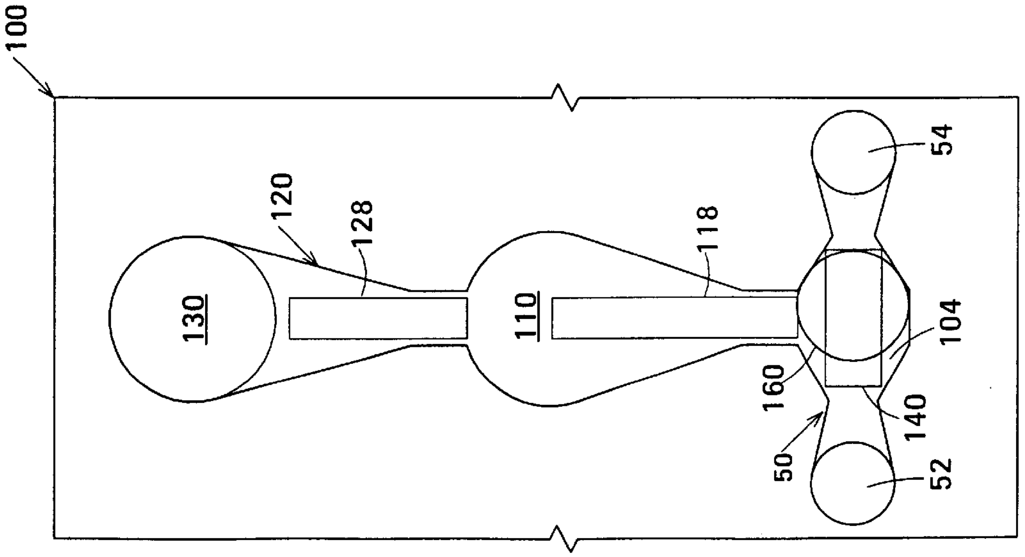

FIG. 3A shows the bubble 160 of air captured in the bubble capture chamber 104. The air constituting the bubble has been released from the ink flowing through the ink delivery channel 50 by the heat generated by the gas release heater 140. As noted above, the bubble 160 could be constituted of air released from the ink by the action of elements other than the gas release heater 140.

FIG. 3B shows the gas extraction device 100 after the controller 142 (FIG. 2B) has started to feed current through to the extraction heater 118 located in the primary extraction chamber 110. Heating the ink in the primary extraction chamber boils the ink, and the resulting ink vapor forms the bubble 162. The bubble 162 grows explosively and quickly encounters the walls of the tapered chamber 114.

FIG. 3C shows the bubble 162 after it has contacted the walls of the tapered chamber 114. Contact between the bubble and the walls of the tapered chamber causes the bubble to move in the direction indicated by the arrow 164. The motion of the bubble 162 draws the bubble 160 in the bubble capture chamber 104 towards the neck 112 of the primary extraction chamber 110. The bubble 162 also expands into the neck 112.

Figure 3D:
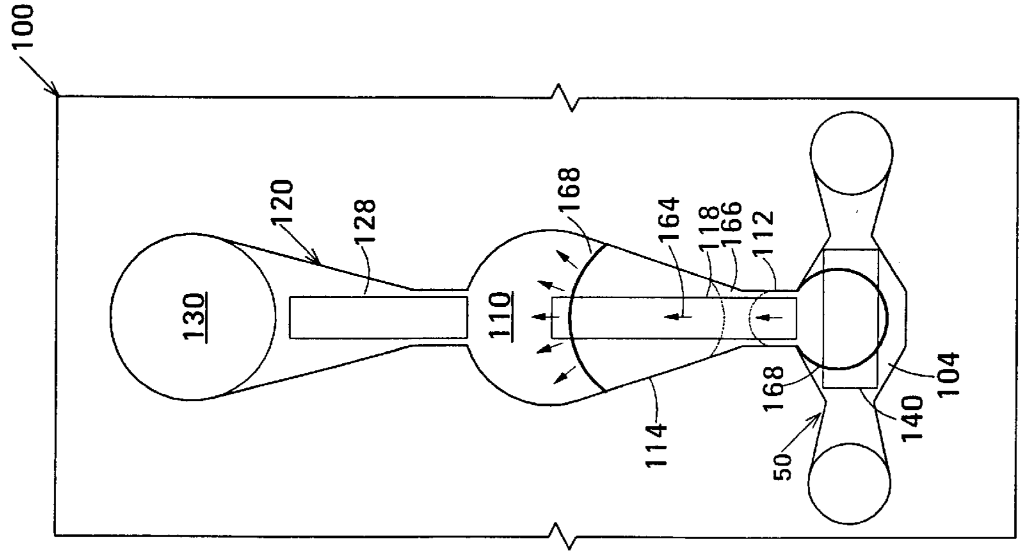

FIG. 3D shows the bubble 162 after its expansion into the neck 112 has expelled the ink 166 from the neck and the bubbles 160 and 162 have connected to form the composite bubble 168. The bubble 168 has been observed to form in a time corresponding to less than one frame of a 1000 frames/sec high-speed camera.

Figure 3E:
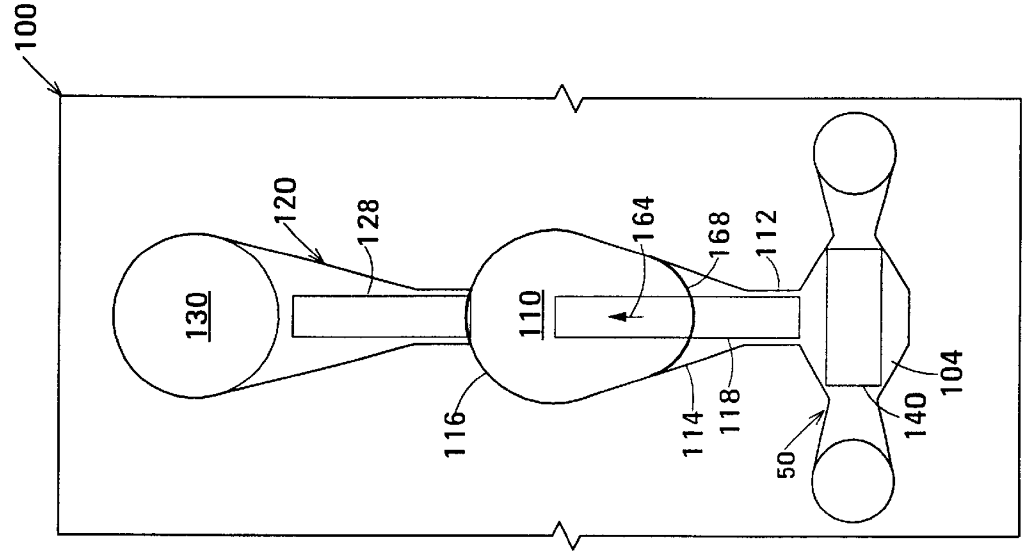

FIG. 3E shows how contact with the walls of the tapered chamber 114 moves the composite bubble 168 in the direction indicated by the arrow 164. This motion draws the portion of the composite bubble located in the bubble capture chamber 104 into the primary extraction chamber 110.

Figure 3F:
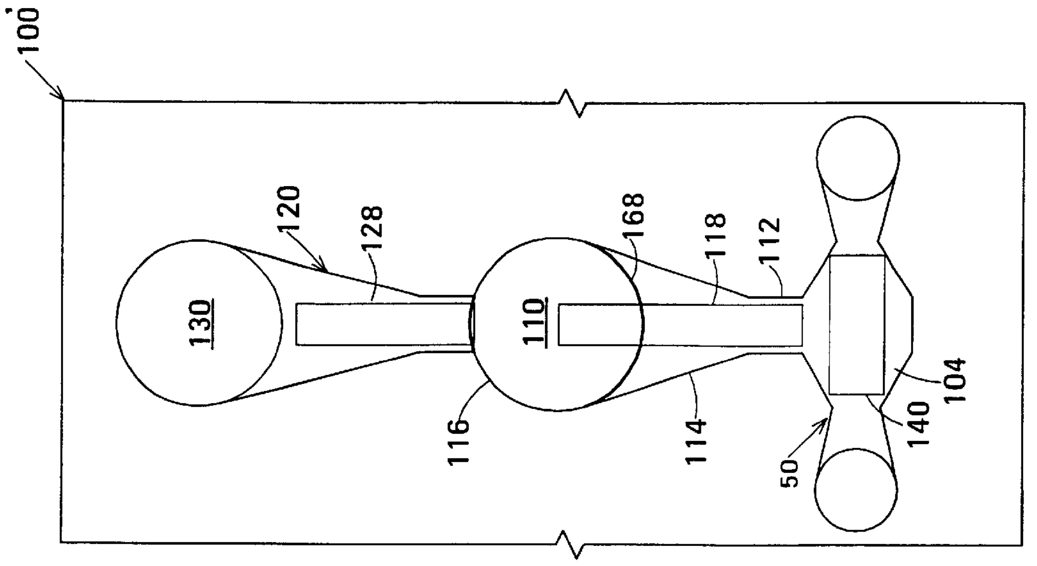

FIG. 3F shows the composite bubble 168 after the controller 142 (FIG. 2B) has stopped feeding current to the extraction heater 118, and the heater no longer heats the composite bubble. Not heating the composite bubble causes the vapor component of the bubble, mainly contributed by the bubble 162, to condense. As a result, the composite bubble shrinks and becomes mainly a bubble of air. Most of the air is contributed by the bubble 160 (FIG. 3A), although nucleating and growing the bubble 162 releases additional air from the ink. The additional air becomes part of the bubble 162 and, hence, part of the composite bubble 168. The composite bubble continues to move in the direction indicated by the arrow 164 until it comes to rest in the semicircular portion 116 of the tapered chamber 114, where the spatial energy potential is a minimum, or until it loses contact with the walls of the tapered chamber.

Although the air bubble 160 (FIG. 3A) has been successfully removed from the ink delivery channel 50, the air that constituted the bubble 160, and which now forms part of the composite bubble 168, must be transferred from the primary extraction chamber 110 through the secondary extraction chamber 120 to the exhaust manifold 130. To remove the composite bubble from the primary extraction chamber, the controller 142 (FIG. 2B) feeds pulses of current to the extraction heater 128 located in the secondary extraction chamber.

Figure 3I:
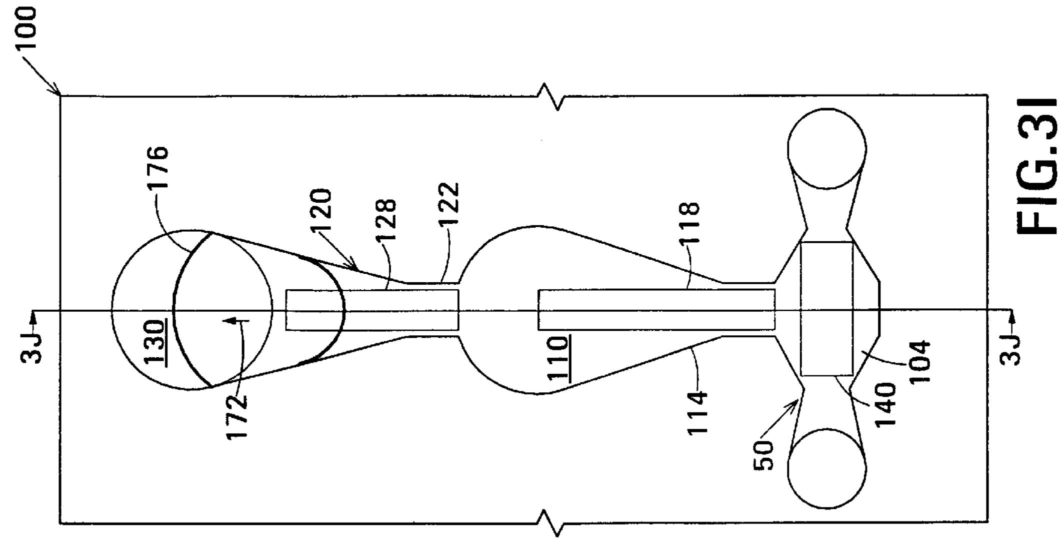
Figure 3H:
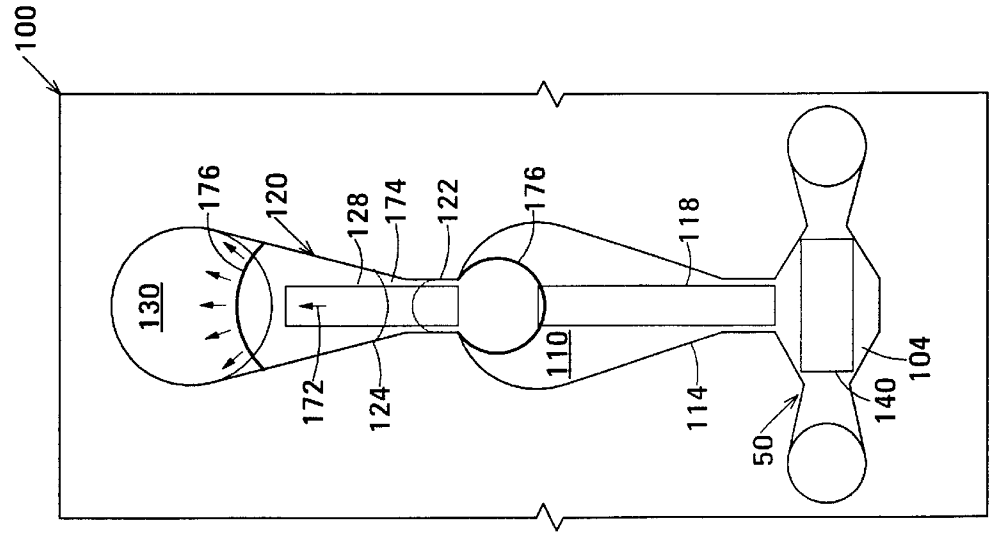
Figure 3G:
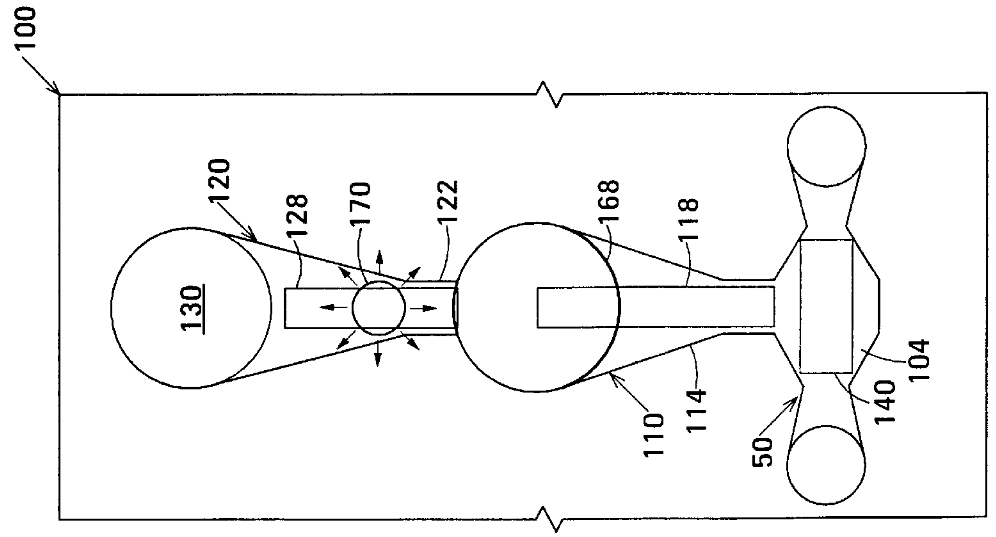

FIG. 3G shows the bubble 170 formed as a result of the extraction heater 128 heating the ink located in the secondary extraction chamber 120. Heating the ink in the secondary extraction chamber boils the ink, and the resulting ink vapor forms the bubble 170. The bubble 170 grows explosively and quickly encounters the walls of the tapered chamber 124 and expands into the neck 122.

FIG. 3H shows the bubble 170 after it has grown explosively and has encountered the walls of the tapered chamber 124 and has expanded into the neck 122. Expansion into the neck expels the ink 174 from the neck and the bubbles 168 and 170 connect to form the composite bubble 176. Contact with the walls of the tapered chamber 124 causes the composite bubble 176 to move in the direction indicated by the arrow 172. This motion draws the portion of the composite bubble located in the semicircular portion 116 of the primary extraction chamber 110 into the secondary extraction chamber 120.

FIG. 3I shows the composite bubble 176 after the controller 142 (FIG. 2B) has stopped feeding current to the extraction heater 128, and the heater no longer heats the composite bubble. Not heating the composite bubble causes the vapor component of the bubble, mainly contributed by the bubble 170, to condense. As a result, the composite bubble 176 shrinks, and becomes mainly a bubble of air. Most of the air is contributed by the bubble 168 (FIG. 3F), although nucleating and growing the bubble 170 releases additional air from the ink that becomes part of the bubble 170 and, hence, part of the composite bubble. The composite bubble continues to move in the direction indicated by the arrow 172 towards the exhaust manifold 130, propelled by the walls of the tapered chamber 124.

Figure 3L:
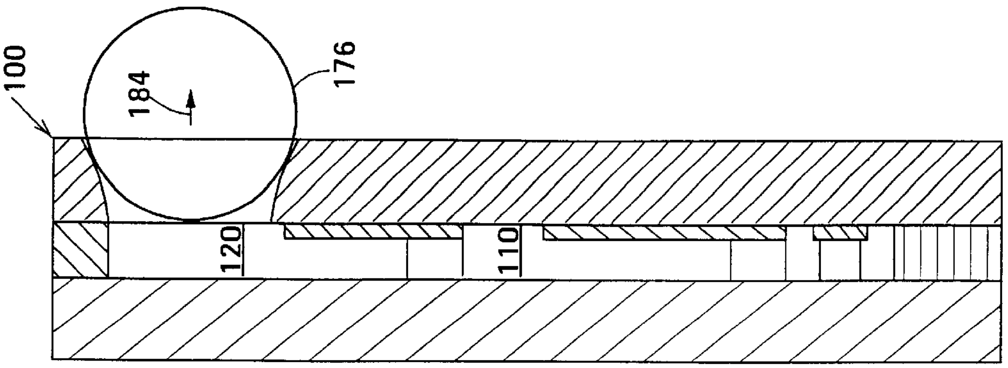
FIGS. 3J and 3L are cross sectional views similar to FIG. 1B and illustrating part of the operation of the first embodiment of the gas extraction device according to the invention.
Figure 3K:
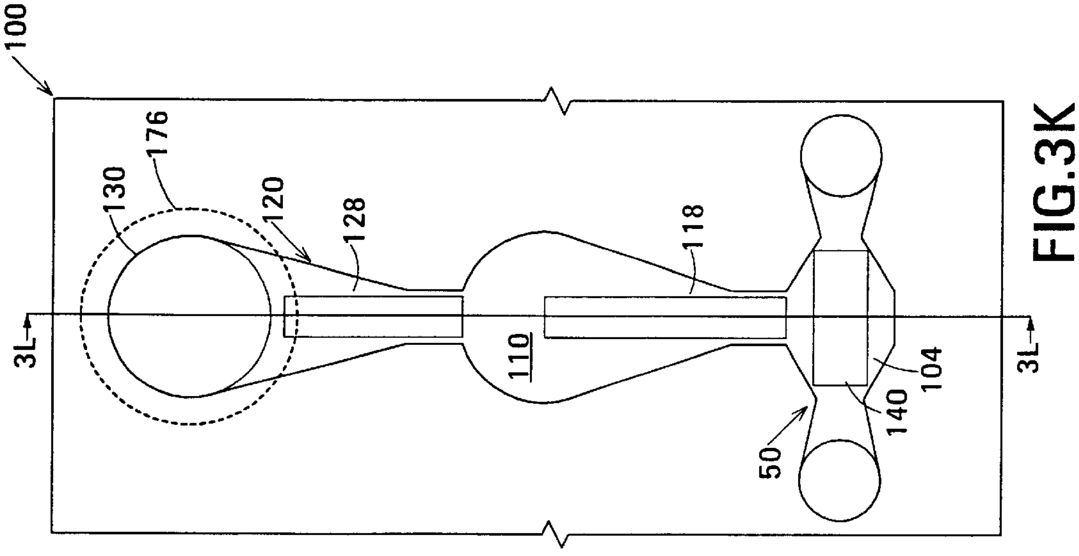
Figure 3J:
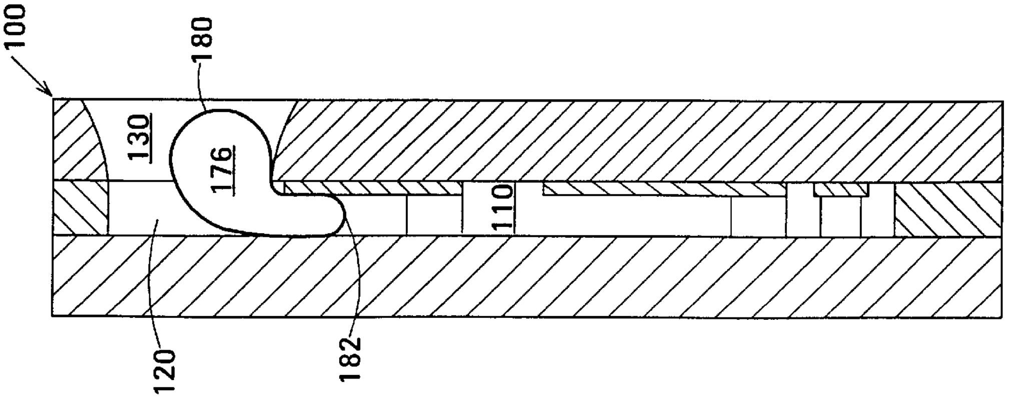

FIG. 3J shows that, as the composite bubble 176 begins to overlap the exhaust manifold 130, the radius of curvature of the portion 180 the surface of the composite bubble rapidly increases. The pressure difference caused by the differing radii of curvature of the portions 180 and 182 of the surface of the composite bubble propels the composite bubble into the exhaust manifold 130.

FIGS. 3K and 3L show the momentum of the composite bubble carrying the composite bubble into the exhaust manifold 130 in the direction indicated by the arrow 184.

It has been observed that the composite bubble 168 often fragments before the entire composite bubble has moved from the bubble capture chamber 104 to the primary extraction chamber 110. When the composite bubble fragments, part of the composite bubble moves into the primary extraction chamber, leaving behind a smaller version of the bubble 160 in the bubble capture chamber 104. The controller 142 re-energizes the extraction heater 118 to repeat the sequence illustrated in FIGS. 3B–3F and move the bubble left behind in the bubble capture chamber to the primary extraction chamber 110. The controller may repeat the sequence illustrated in FIGS. 3B–3F several times to remove the bubble 160 completely from the bubble capture chamber. Moreover, the controller may repeat the sequence illustrated in FIGS. 3G–3I to remove the composite bubble 168 completely from the primary extraction chamber.

Figure 4A:
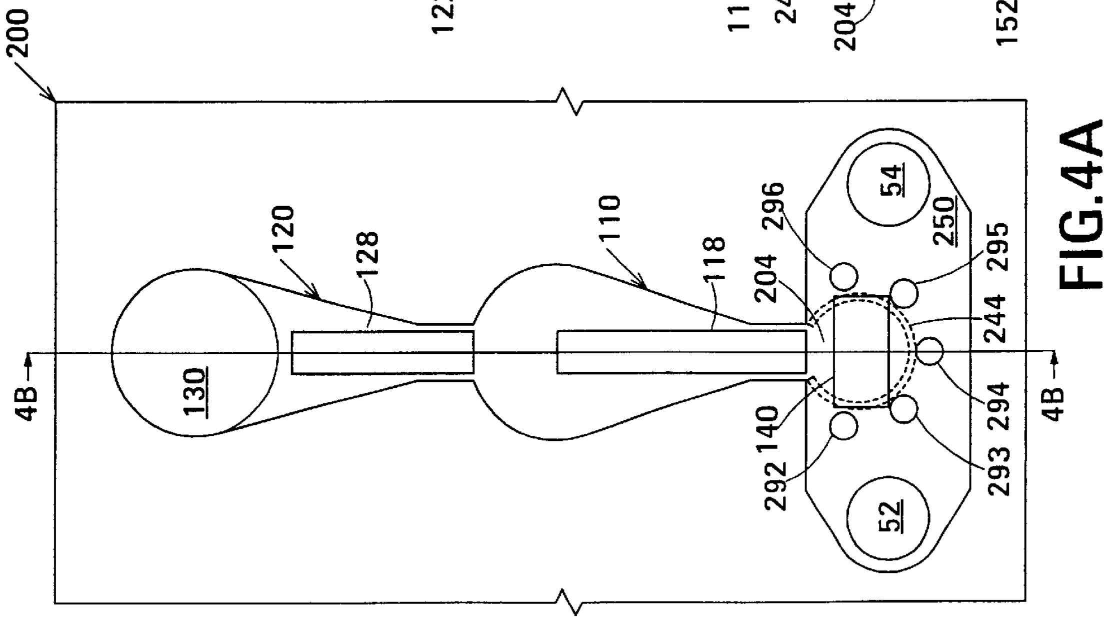
FIG. 4A is a plan view of a second embodiment of a gas extraction device according to the invention having a transparent cover that shows the inner structure.
Figure 4B:
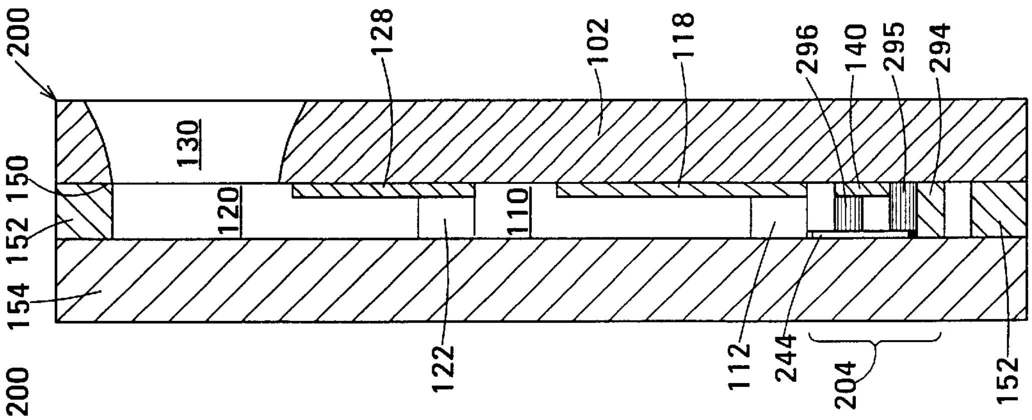
FIG. 4B is a cross-sectional view of the second embodiment of the gas extraction device according to the invention.
Figure 4C:
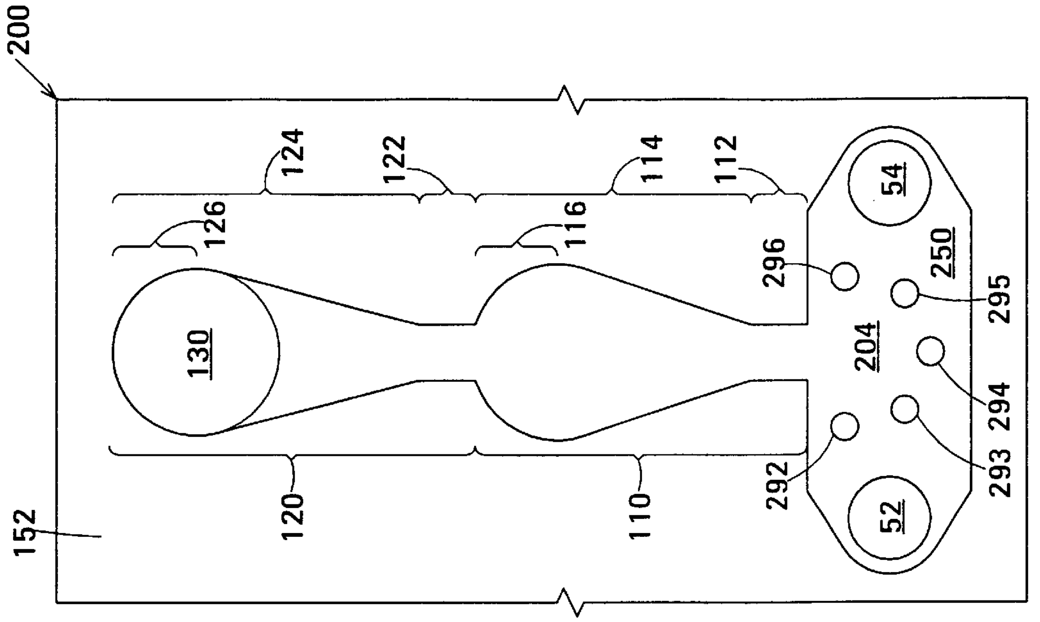
FIG. 4C is a plan view of the elements defined in the barrier layer in the second embodiment of a gas extraction device according to the invention.

FIGS. 4A, 4B and 4C show a second embodiment 200 of a gas extraction device according to the invention. In this embodiment, the bubble capture chamber 204 is separated from the ink delivery channel 250 to allow ink to continue to flow through the ink delivery channel when a large air bubble fills the bubble capture chamber. Elements of the gas extraction device 200 that correspond to elements of the gas extraction device 100 shown in FIGS. 1A–1C are indicated using the same reference numerals and will not be described in detail again here.

In the gas extraction device 200, the ink delivery channel 250 extends between the ink inlet 52 and the ink outlet 54. The ink delivery channel is substantially wider than the ink delivery channel 50 shown in FIGS. 1A–1C. The primary extraction chamber 110 and the secondary extraction chamber 120 extend in series from a point in the ink delivery channel between the ink inlet and the ink outlet and the exhaust manifold 130.

The bubble capture chamber 204 is located in the ink delivery channel 250 at the junction between the primary extraction chamber 110 and the ink delivery channel. The bubble capture chamber is delineated from the ink delivery channel by an arrangement of pillars. In the example shown in FIGS. 4A–4C, the periphery of the bubble capture chamber is defined by an arrangement of five pillars 292–296, each having a circular cross section in the plane parallel to the surface 150 of the substrate 102. The pillars are approximately located on a segment of a circle. However, the bubble capture chamber can be defined by a different number of pillars from that shown, pillars having a cross-sectional shape from that shown, and a different arrangement of pillars from that shown.

The pillars 292–296 delineating the bubble capture chamber 204 from the ink delivery channel 250 are spaced more closely than the width of the neck 112 of the primary extraction chamber so that the neck has a spatial energy potential lower than that of the boundary of the bubble capture chamber defined by the pillars and the gaps between them. Moreover, the pillars are spaced and dimensioned to allow ink flowing through the ink delivery channel from the ink inlet 52 to the ink outlet 54 also to flow freely through the bubble capture chamber 204. The ink that flows through the bubble capture chamber comes into contact with the gas release heater 140. Heat generated by the gas release heater releases air from the ink to generate the bubble 260 shown in FIG. 5. The regions between adjacent pillars, and between the pillars and the ink delivery channel are regions of high spatial energy potential that effectively confine the bubble 260 to the bubble capture chamber. The bubble capture chamber has a substantially lower spatial energy potential than the regions between the pillars.

The shapes of the pillars 292–296 are defined in the barrier layer 152 in the same operation as the shapes of the ink delivery channel 250, the primary extraction chamber 110 and the secondary extraction chamber 120. FIG. 4C shows the shapes of the pillars, the ink delivery channel, the primary extraction chamber and the secondary extraction chamber as defined in the barrier layer. The heaters 118, 128 and 140 shown in FIG. 4A are omitted from FIG. 4C to simplify the drawing.

The electrical arrangement of the embodiment shown in FIGS. 4A–4C is the same as that shown in FIG. 2B. FIGS. 4A and 4B show the sensor 244 of a gas/liquid detector (not shown) that detects the size of the bubble accumulated in the bubble capture chamber. The gas/liquid detector generates a control signal that is fed to a control circuit similar to the control circuit 142 shown in FIG. 2B. The control circuit activates the extraction heater 118 in response to a change in state of the control signal.

The embodiment shown in FIGS. 4A–4C can be made using the process described above for making the embodiment shown in FIGS. 1A–1C. Only the masks that define the position of the gas release heater 140 and the shapes formed in the barrier layer 152 need be changed.

Figure 5:
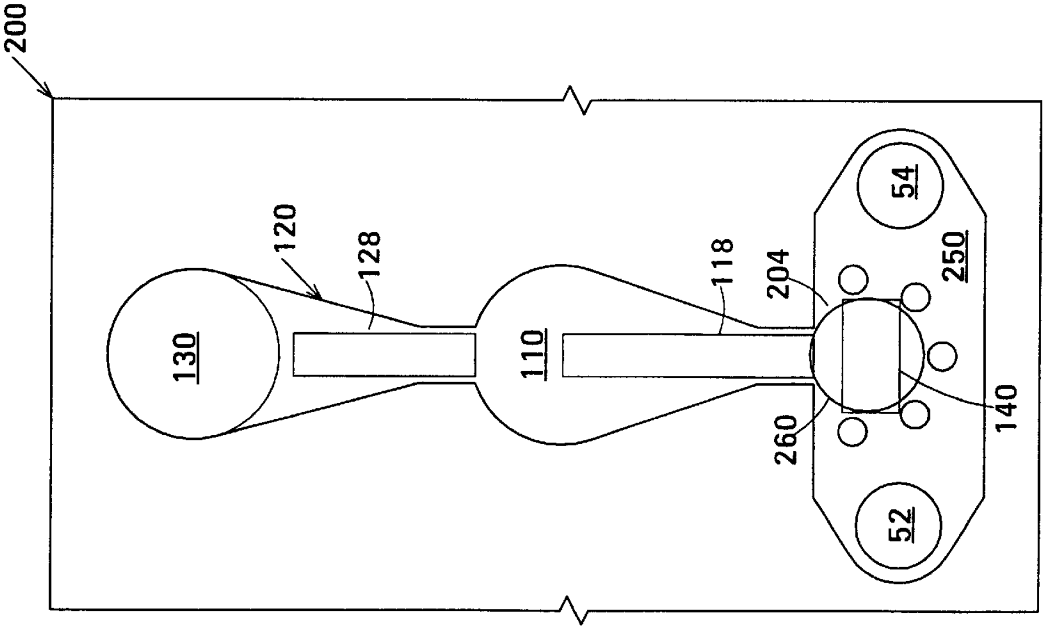
FIG. 5 illustrates part of the operation of the second embodiment of a gas extraction device according to the invention.

FIG. 5 shows the part of the operation of the embodiment 200 of the gas extraction device shown in FIGS. 4A–4C. FIG. 5 shows a bubble of air removed from the ink accumulated in the bubble capture chamber 204. As noted above, ink flowing through the ink delivery channel 250 from the ink inlet 52 to the ink outlet 54 also flows freely through the bubble capture chamber. The ink that flows through the bubble capture chamber comes into contact with the gas release heater 140, and heat generated by the heater releases air from the ink. The air released from the ink accumulates to form the bubble 260. The high spatial energy potential of the gaps between the pillars 292–296 prevents the bubble from moving out of the bubble capture chamber 204. Even when the bubble 260 completely fills the bubble capture chamber, ink is still able to flow around the bubble capture chamber from the ink inlet 52 to the ink outlet 54.

The bubble 260 is transferred from the bubble capture chamber 204 to the exhaust manifold 130 by the controller 142 (FIG. 2B) feeding current to the extraction heater 118 to nucleate and explosively grow a bubble in the primary extraction chamber 110, and then feeding current to the extraction heater 128 to nucleate and explosively grow a bubble in the secondary extraction chamber 120. The process of transferring the bubble 260 to the exhaust manifold is the same as that described above with reference to FIGS. 3B–3L, and therefore will not be described again here. The process of transferring the bubble to the exhaust manifold may be performed at predetermined time intervals, or in response to the sensor 244 located in the bubble capture chamber detecting when the air bubble that accumulates in the bubble capture chamber has grown to size that substantially fills the bubble capture chamber, and therefore needs to be removed.

In the embodiments described above, the extraction heater 118 is associated with the primary extraction chamber 110 by locating it in the primary extraction chamber. However, the extraction heater associated with the primary extraction chamber may alternatively be located in the bubble capture chamber 204, as in the embodiment 300 shown in FIG. 6. Locating the extraction heater associated with the primary extraction chamber in the bubble capture chamber allows a single physical heater element to perform the functions of the extraction heater and the gas release heater. Elements of the embodiment shown in FIG. 6 that correspond to elements of the embodiment shown in FIGS. 4A–4C are indicated by the same reference numerals and will not be described again here.

Figure 6:
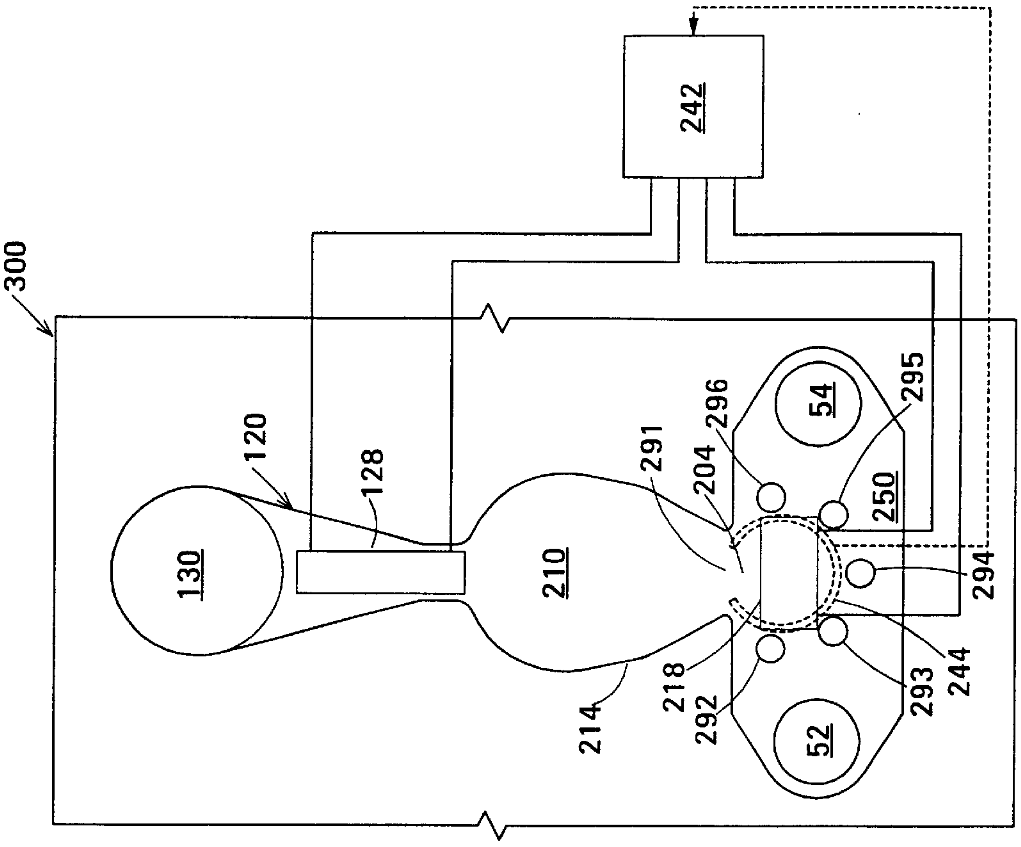
FIG. 6 is a plan view of a third embodiment of a gas extraction device according to the invention having a transparent cover that shows the inner structure and additionally schematically shows the electrical arrangement of the embodiment.

In the gas extraction device 300 shown in FIG. 6, the extraction heater 218 associated with the primary extraction chamber 210 is located in the bubble capture chamber 204. The extraction heater 218 performs the functions of both the gas release heater 140 and the extraction heater 118 in the embodiments described above.

The primary extraction chamber 210 differs from the primary extraction chamber 110 shown in FIGS. 4A–4C in that the tapered chamber 214 connects directly to the part of the ink delivery channel 250 occupied by the bubble capture chamber. The primary extraction chamber 210 also differs from the primary extraction chamber 110 in that the rate at which its tapered chamber 214 widens with increasing distance from the ink delivery channel is greater at its narrow end adjacent the ink delivery channel, and is less at its wide end, remote from the ink delivery channel.

The mouth 291 of the tapered chamber 214 is wider than the width of the neck 112 of the primary extraction chamber 110 (FIG. 4A) to ensure that the mouth is wider than the gaps between the pillars, such as the pillars 292 and 293, defining the boundary of the bubble capture chamber 204 in the ink delivery channel 250. This relationship ensures that the spatial energy potential of the mouth is less than the spatial energy potential of any of the gaps between the pillars. In other words, the mouth is dimensioned so that its spatial energy potential is less than the minimum spatial energy potential of the boundary of the bubble capture chamber.

The extraction heaters 218 and 128 generate heat in response to electric currents supplied the controller 242. The controller preferably operates in response to one or more gas/liquid detectors as described above. FIG. 6 shows the sensor 244 of one gas/liquid detector (not shown) located in the bubble capture chamber 204. The sensor 244 detects the size of the bubble (260 in FIG. 7A) that accumulates in the bubble capture chamber 204. The output signal of the gas/liquid detector preferably changes state when the bubble substantially fills the bubble capture chamber. The sensor of a second gas/liquid detector (not shown) may optionally be located in the primary extraction chamber 210, remote from the mouth 291.

The embodiment shown in FIG. 6 can be made using the process described above for making the embodiment shown in FIGS. 1A–1C. Only the masks that define the positions of the heaters on the substrate and the shapes formed in the barrier layer need be changed.

Operation of the embodiment 300 of the gas extraction device shown in FIG. 6 will now be described with reference to FIGS. 6 and 7A–7D. The controller 242, the sensor 244, and the connections between the controller and the heaters 128 and 290 and the sensor are omitted from FIGS. 7A–7D to simplify the drawings. Initially, the controller 242 feeds a relatively low current through the extraction heater 218. When fed with a relatively low current, the extraction heater 218 functions as a gas release heater similar to the gas release heater 140 shown in FIG. 4A, for example. Heat generated by the extraction heater 218 releases dissolved air from the ink flowing through the ink delivery channel from the ink inlet 52 to the ink outlet 54. The air released from the ink accumulates in the bubble 260 trapped in the bubble capture chamber 204.

Figure 7B:
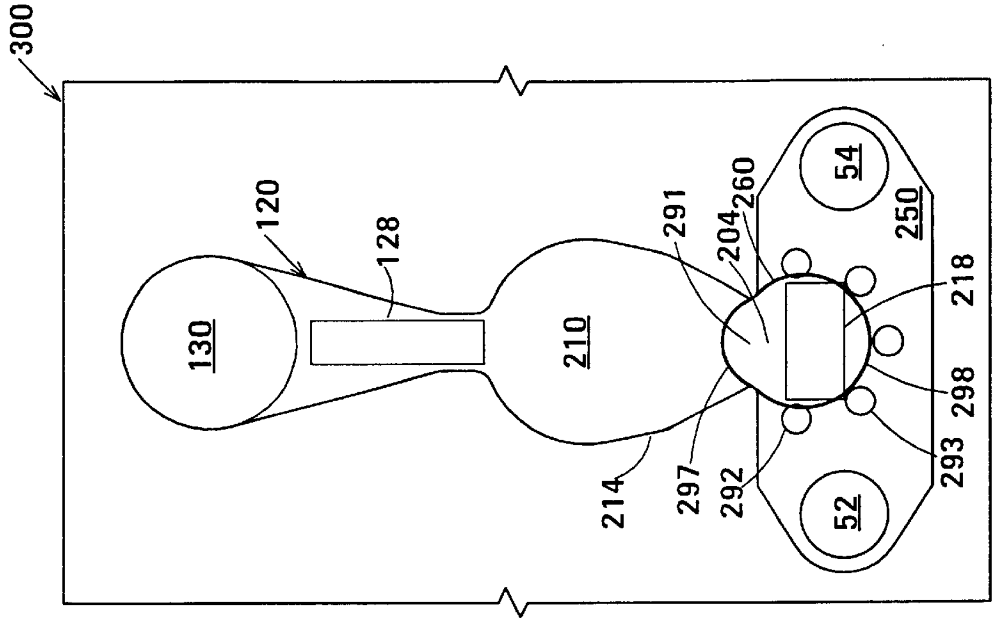
FIGS. 7A–7D are plan views of the third embodiment of a gas extraction device according to the invention illustrating the second method of removing gas according to the invention.
Figure 7A:
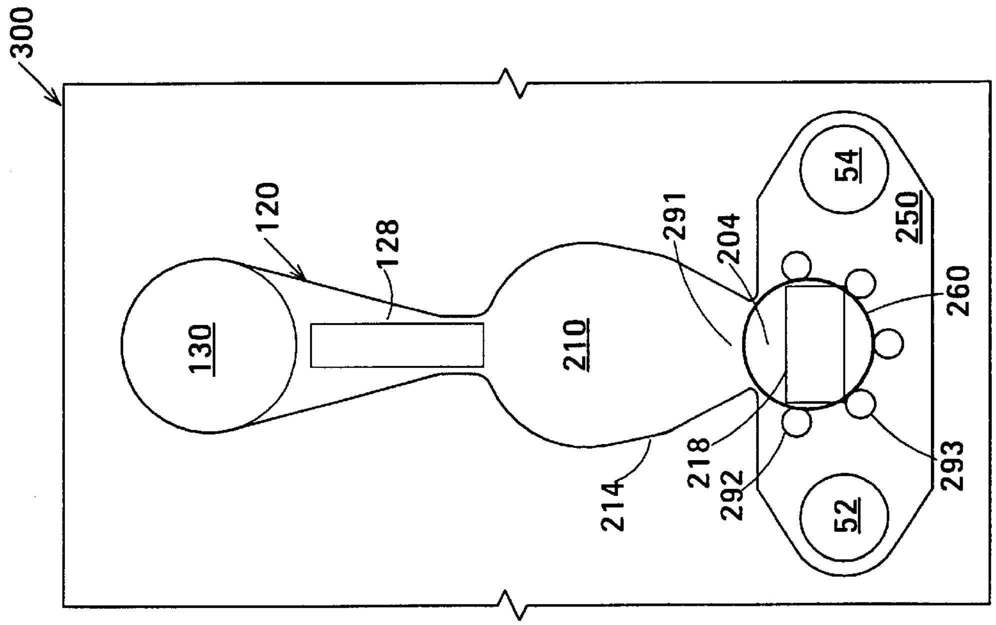

The output signal of the gas/liquid detector that includes the sensor 244 changes state when the bubble 260 grows to a size that substantially fills the bubble capture chamber 204, as shown in FIG. 7A. In response to the change of state of the output signal of the gas/liquid detector, the controller 242 increases the current fed to the extraction heater 218. When fed with a relatively high current, the extraction heater 218 functions as the extraction heater associated with the primary extraction chamber 210, similar to the extraction heater 118 shown in FIG. 4A.

The additional heat generated by the extraction heater 218 causes the air constituting the bubble 260 to expand. Since the region with the lowest spatial energy potential surrounding the bubble is the mouth 291 of the primary extraction chamber 210, the bubble expands preferentially into the primary extraction chamber, as shown in FIG. 7B. However, the pressure difference resulting from the radius of curvature of the surface 297 of the bubble in the primary extraction chamber being less than that of the surface 298 of the bubble in the bubble capture chamber holds the bubble in the bubble capture chamber.

Continued heating of the bubble 260 by the extraction heater 218 causes the bubble to expand further. As the bubble expands, the surface 297 of the bubble in the primary extraction chamber 110 advances into the tapered chamber 214 and comes into contact with the walls of the tapered chamber. The radius of curvature of the surface 297 progressively increases as the surface 297 advances along the progressively-widening walls of the tapered chamber. When the radius of curvature of the surface 297 exceeds that of the surface 298 of the bubble in the bubble capture chamber 204, the direction of the pressure difference between the surfaces reverses. The pressure difference between the surfaces starts to move the bubble 260 out of the bubble capture chamber 204 and into the primary extraction chamber 210, as indicated by the arrow 299 shown in FIG. 7C.

Figure 7D:
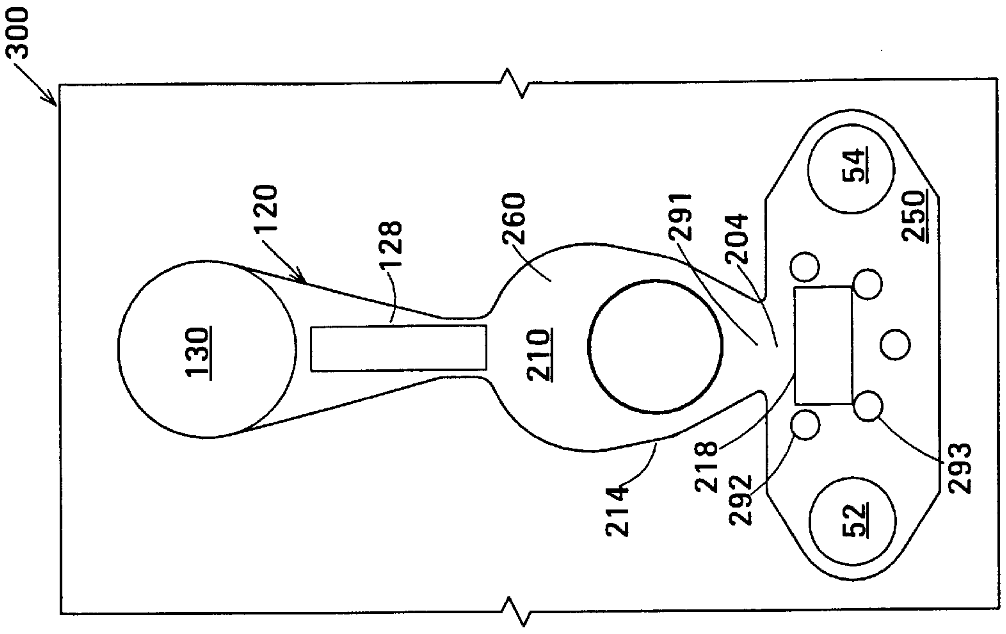
Figure 7C:
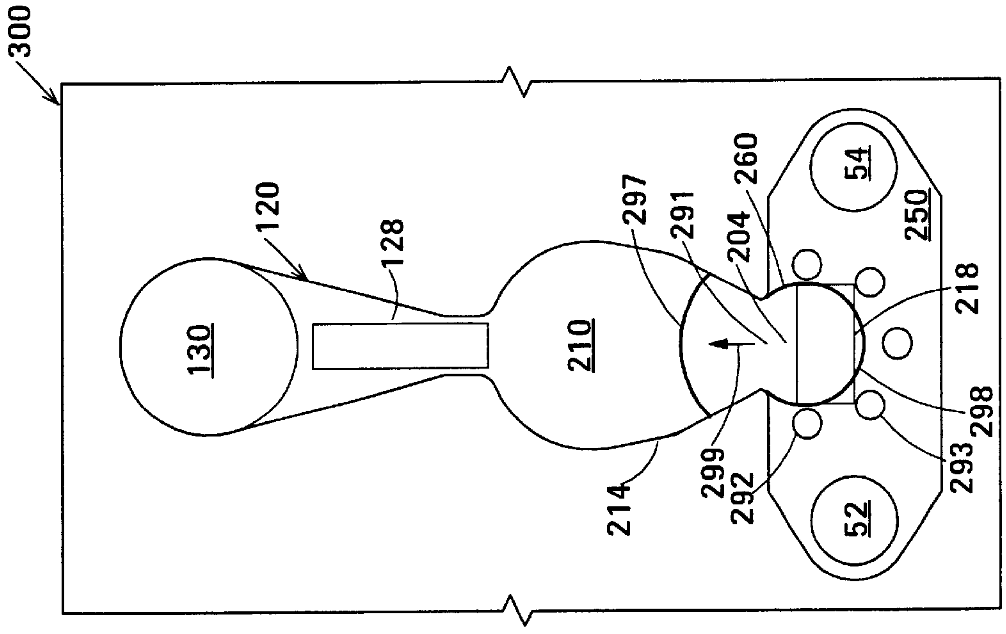

As the bubble 260 moves into the primary extraction chamber 210, the radius of curvature of the surface 297 continues to increase, which increases the pressure difference across the bubble. The increasing pressure difference accelerates the bubble as the bubble enters the primary extraction chamber. Eventually, however, movement of the bubble 260 into the primary extraction chamber moves the bubble out of contact with the extraction heater 218. When this occurs, the bubble rapidly cools and loses contact with the walls of the tapered chamber 214. However, the momentum of the bubble carries it further into the primary extraction chamber 210, as shown in FIG. 7D. Additional bubbles transferred from the bubble capture chamber to the primary extraction chamber merge with the bubble 260 to form an enlarged bubble (not shown). Contact between the enlarged bubble and the walls of the tapered chamber 214 move the enlarged bubble towards the end of the tapered chamber remote from the mouth 291. Eventually, the enlarged bubble grows to a size that substantially fills the end of the tapered chamber remote from the mouth. The controller 242 then activates the extraction heater 128 to extract the enlarged bubble from the primary extraction chamber through the secondary extraction chamber 120 to the exhaust manifold 130 as described above. Several bubbles may accumulate in the primary extraction chamber before the extraction heater 128 is activated.

The controller 242 may detect the loss of contact between the extraction heater 218 and the bubble 260 by monitoring the temperature of the heater. The temperature of the heater will drop as more of the heater comes into contact with the ink in the bubble capture chamber. When the controller detects the loss of contact, it reduces the power to the extraction heater 218 and the extraction heater once more functions as a gas release heater to generate another bubble of gas in the bubble capture chamber 204.

The invention is described above with reference to illustrative embodiments in which air removed from the ink flowing into or through the print head of an inkjet printer is transferred to an exhaust manifold at atmospheric pressure. However, the invention may be used in other microfluidics systems to transfer other gases removed from other liquids to an exhaust manifold held at an ambient pressure other than atmospheric pressure.

The invention is described above with reference to illustrative embodiments in which a single gas extraction device extends between the ink delivery channel and the exhaust manifold. However, the invention is not limited to this. Multiple parallel gas extraction devices may extend between the ink delivery channel and the exhaust manifold. Moreover, the pressure in the exhaust manifold may be different from atmospheric pressure.

Although this disclosure describes illustrative embodiments of the invention in detail, it is to be understood that the invention is not limited to the precise embodiments described, and that various modifications may be practiced within the scope of the invention defined by the appended claims.

We claim:

1. A method of removing gas from a liquid, the method comprising:

providing:

a bubble capture chamber, an exhaust manifold, and a tapered extraction chamber extending from the bubble capture chamber towards the exhaust manifold, the tapered extraction chamber having walls that taper outwards with increasing distance from the bubble capture chamber;

accumulating a bubble of gas in the bubble capture chamber;

heating a portion of the liquid in the tapered extraction chamber to nucleate a bubble of vapor;

heating the bubble of vapor to explosively expand the bubble of vapor into contact with the walls of the tapered extraction chamber and into contact with the bubble of gas to form a composite bubble, contact with the walls of the tapered extraction moving the composite bubble towards the exhaust manifold; and discontinuing heating of the composite bubble to condense the vapor in the composite bubble.

2. The method of claim 1, in which heating the liquid and heating the bubble include:

providing a resistor located in the tapered extraction chamber, and feeding electric current through the resistor.

3. The method of claim 2, in which:

the resistor is located on a substrate; and feeding the electric current through the resistor includes pulsing the current to reduce heat transfer from the resistor to the substrate.

4. The method of claim 1, which heating the liquid and heating the bubble include:

providing an energy dissipator located in the tapered extraction chamber; and feeding energy to the energy dissipator.

5. The method of claim 1, in which:

the method additionally comprises detecting a size of the bubble of gas in the bubble capture chamber; and heating the liquid and heating the bubble are performed after the bubble of gas in the bubble capture chamber has been detected to have grown to a predetermined size.

6. The method of claim 1, in which heating the liquid and heating the bubble are repetitively performed at a predetermined timing.

7. The method of claim 1, in which:

the tapered extraction chamber is a secondary extraction chamber, the bubble of vapor nucleated therein is a second bubble of vapor, and the composite bubble formed therein is a second composite bubble;

a primary extraction chamber is additionally provided, the primary extraction chamber being interposed between the secondary extraction chamber and the bubble capture chamber, the primary extraction chamber having a cross-sectional area that increases with increasing distance from the bubble capture chamber; and prior to heating the portion of the liquid in the secondary extraction chamber to nucleate a bubble of vapor, the method additionally comprises:

heating a portion of the liquid in the primary extraction chamber to nucleate a first bubble of vapor, heating the first bubble of vapor to explosively expand the first bubble of vapor into contact with the walls of the primary extraction chamber and into contact with the bubble of gas to form a first composite bubble, contact between the first composite bubble and the walls of the tapered extraction chamber moving the first composite bubble towards the secondary extraction chamber, and discontinuing heating of the first composite bubble to condense the vapor in the first composite bubble to recover the bubble of gas.

8. A method of removing gas from a liquid, the method comprising:

providing:

a bubble capture chamber including a boundary having a spatial energy potential, an exhaust manifold, and a tapered extraction chamber extending from the bubble capture chamber towards the exhaust manifold, the tapered extraction chamber including:

walls that taper outwards with increasing distance from the bubble capture chamber; and a mouth adjacent the bubble capture chamber, the mouth being dimensioned to have a spatial energy potential less than the spatial energy potential of the boundary of the bubble capture chamber;

accumulating a bubble of gas in the bubble capture chamber; and heating the bubble of gas in the bubble capture chamber to expand the bubble into the tapered extraction chamber, the bubble after expansion including a first surface having a first radius of curvature in the bubble capture chamber and a second surface having a second radius of curvature in contact with the walls of the tapered extraction chamber, the heating being continued at least until the bubble of gas expands to a size at which the second radius of curvature becomes greater than the first radius of curvature and a resulting pressure difference moves at least part of the bubble from the bubble capture chamber to the tapered extraction chamber.

9. The method of claim 8, in which:

the method additionally comprises detecting a size of the bubble of gas accumulated in the bubble capture chamber; and heating the bubble of gas is performed in response to detecting that the bubble of gas accumulated in the bubble capture chamber has grown to a size that substantially fills the bubble capture chamber.

* * * * *